United States Patent
Cempini et al.

(10) Patent No.: US 10,736,809 B2
(45) Date of Patent: Aug. 11, 2020

(54) ERGONOMIC EXOSKELETON SYSTEM FOR THE UPPER LIMB

(71) Applicants: SCUOLA SUPERIORE DI STUDI UNIVERSITARI E DI PERFEZIONAMENTO SANT'ANNA, Pisa (IT); AZIENDA OSPEDALIERA PISANA, Pisa (IT)

(72) Inventors: Marco Cempini, Terricciola (IT); Nicola Vitiello, Pontedera (IT); Francesco Giovacchini, Pisa (IT); Matteo Moise, Ponte Buggianese (IT); Mario Cortese, Cascina (IT)

(73) Assignees: SCUOLA SUPERIORE DI STUDI UNIVERSITARI E DI PERFEZIONAMENTO SANT'ANNA, Pisa (IT); AZIENDA OSPEDALIERA PISANA, Pisa (IT)

( * ) Notice: Subject to any disclaimer, the term of this patent is extended or adjusted under 35 U.S.C. 154(b) by 274 days.

(21) Appl. No.: 15/565,610

(22) PCT Filed: Apr. 11, 2016

(86) PCT No.: PCT/IB2016/052049
§ 371 (c)(1),
(2) Date: Oct. 10, 2017

(87) PCT Pub. No.: WO2016/166652
PCT Pub. Date: Oct. 20, 2016

(65) Prior Publication Data
US 2018/0071163 A1    Mar. 15, 2018

(30) Foreign Application Priority Data

Apr. 11, 2015 (IT) .................... PI2015A0027

(51) Int. Cl.
*A61H 1/02*     (2006.01)
*B25J 9/00*     (2006.01)
*F16H 25/20*    (2006.01)

(52) U.S. Cl.
CPC ......... *A61H 1/0277* (2013.01); *A61H 1/0281* (2013.01); *A61H 2201/0157* (2013.01);
(Continued)

(58) Field of Classification Search
CPC ............ A61H 1/0277; A61H 1/0281; A61H 2201/0157; A61H 2201/1215;
(Continued)

(56) References Cited

U.S. PATENT DOCUMENTS

2008/0009771 A1* 1/2008 Perry ............... B25J 9/0006
                                                600/587
2012/0046578 A1* 2/2012 Agrawal ............ A61H 1/024
                                                601/35

(Continued)

FOREIGN PATENT DOCUMENTS

WO    WO 95/32842 A2    12/1995
WO    WO 2013/186705 A2    12/2013
(Continued)

OTHER PUBLICATIONS

"Shock Absorber Specifications 7610 Series & 76 Series Shock Absorber Springs," https://web.archive.org/web/20050623193629/http://ikonsuspension.com/content/7610-76.html, Retrieved on Sep. 26, 2018, 3 Pages.

(Continued)

*Primary Examiner* — Kendra D Carter
*Assistant Examiner* — Arielle Wolff
(74) *Attorney, Agent, or Firm* — Workman Nydegger

(57) ABSTRACT

Exoskeleton kinematic chain arranged to pivotally connect a first element to a second element, said first element com-
(Continued)

prising two pivot points $A_1$ and $B_1$ located at a distance $\overline{A_1B_1}$, said second element comprising two pivot points $A_2$ and $B_2$ located at a distance $\overline{A_2B_2}$. The exoskeleton kinematic chain comprises a first external link pivotally connected to the first element at the pivot point $A_1$ and a first end link pivotally connected to the first external link at a pivot point $D_1$, said pivot point $D_1$ being located at a distance $\overline{A_1D_1}$ by the pivot point $A_1$. The exoskeleton kinematic chain comprises then a second external link pivotally connected to the second element at the pivot point $A_2$, and a second end link pivotally connected to the second external link at a pivot point $D_2$, said pivot point $D_2$ being located at a distance $\overline{A_2D_2}$ by the pivot point $A_2$. The exoskeleton kinematic chain also comprises a first intermediate link pivotally connected to the first element at the pivot point $B_1$ and integrally connected to the second end link at a junction point $C_2$, a second intermediate link pivotally connected to the second element at the pivot point $B_2$ and integrally connected to the first end link at a junction point $C_1$. The first and the second end link are pivotally connected to each other at a pivot point M. Defining $\widehat{D_2} = \widehat{D_2} = \theta$, for any value of $\theta$, the projections of the pivot points $A_1$, $B_1$, $A_2$, $B_2$ in a plane $\Pi$, lay in a circumference K having center O and radius $r = \overline{A_1D_1} = \overline{A_2D_2} = \overline{D_1B_2} = \overline{MB_2} = \overline{D_2B_1} = \overline{MB_1}$, in such a way that decreasing the value of $\theta$ the first and the second element rotate with respect to each other about an axis z orthogonal to the plane $\Pi$ and passing through the center O in the direction for which the point $A_1$ is overlapped to the point $B_2$.

11 Claims, 9 Drawing Sheets

(52) U.S. Cl.
CPC .. *A61H 2201/1215* (2013.01); *A61H 2201/14* (2013.01); *A61H 2201/1481* (2013.01); *A61H 2201/1616* (2013.01); *A61H 2201/1638* (2013.01); *A61H 2201/1671* (2013.01); *A61H 2201/1676* (2013.01); *B25J 9/0006* (2013.01); *F16H 25/20* (2013.01)

(58) Field of Classification Search
CPC .... A61H 2201/1481; A61H 2201/1616; A61H 2201/1638; A61H 2201/1671; A61H 2201/1676; A61H 2201/14; B25J 9/0006; F16H 25/20; A63B 2023/003
See application file for complete search history.

(56) References Cited

U.S. PATENT DOCUMENTS

| | | | |
|---|---|---|---|
| 2012/0179075 A1 | 7/2012 | Perry et al. | ................ 601/33 |
| 2012/0184880 A1* | 7/2012 | Doyle | ........... A61F 5/013 |
| | | | 601/33 |
| 2013/0237883 A1* | 9/2013 | Malosio | ........... A61H 1/0274 |
| | | | 601/33 |

FOREIGN PATENT DOCUMENTS

| | | | |
|---|---|---|---|
| WO | WO-2013186705 A2 * | 12/2013 | ........... B25J 9/0006 |
| WO | 2014125387 A2 | 8/2014 | |
| WO | 2016065350 A1 | 4/2016 | |

OTHER PUBLICATIONS

Hain, "The Spring Balancing of Loads," Institute of Landtechnik Basic Research the Research Institute for Agriculture Braunschweig-Volkenrode, No. 3, Jan. 1, 1952, pp. 38-50.
International Search Report from PCT Application No. PCT/IB2018/054513, Oct. 12, 2018.
International Search Report dated Jul. 15, 2016, issued to the corresponding International Application No. PCT/IB2016/052049.
International Preliminary Report on Patentability dated Mar. 14, 2017, , issued to the corresponding International Application No. PCT/IB2016/052049.

* cited by examiner

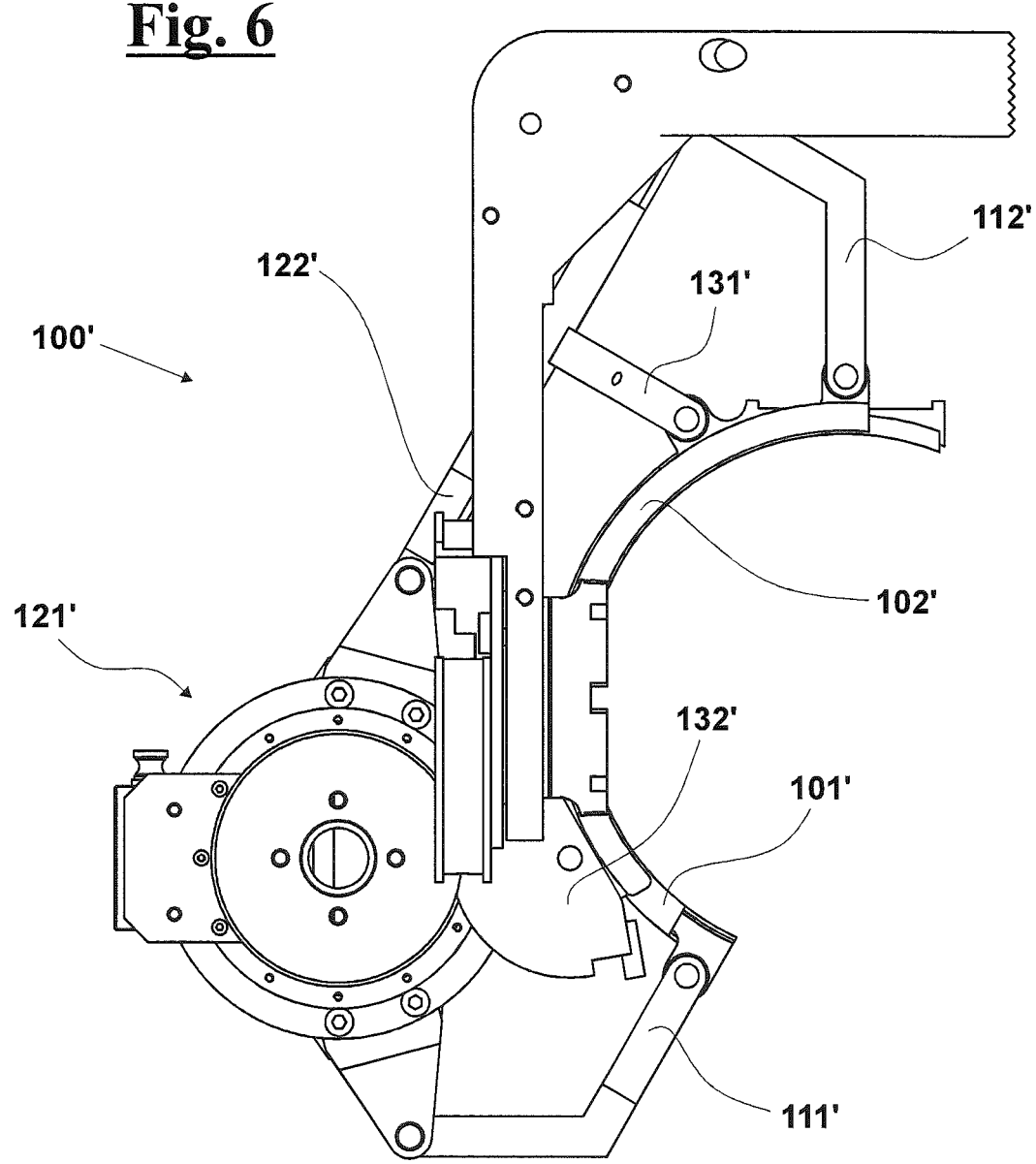

ERGONOMIC EXOSKELETON SYSTEM FOR THE UPPER LIMB

CROSS-REFERENCE TO RELATED APPLICATIONS

This application is a national stage of International Application No. PCT/IB2016/052049, filed Apr. 11, 2016, which claims the benefit of priority to Italian Application No. PI2015A000027, filed Apr. 11, 2015, in the World Intellectual Property Office, the disclosures of which are incorporated herein in their entireties by reference.

FIELD OF THE INVENTION

The present invention relates to an exoskeleton structure for rehabilitation of a user's limb.

In particular, the invention relates to a cylindrical joint for the actuation of a torsion of a longitudinal segment of a user's limb.

DESCRIPTION OF THE PRIOR ART

In the state of the art are there many attempts to provide active orthosis for upper and lower limb. In particular, we speak in a generic way of "exoskeletons" indicating robotized systems having movable joints that can be physically worn (or put into close physical contact) by users who need to maneuver them.

All these systems use electro-mechanical actuators (electromagnetic motors with stages of reduction of the speed of the outlet joints). The main reasons to the development of such systems derive from the need of robotics to generate an increase in physical performances of an operator, to allow a remote manipulation of systems and to provide a rehabilitation to patients with motor deficit. In particular, especially concerning the rehabilitation, the devices presented have often a fixed base, since the proposed use does not require a free mobility or a user's ambulation.

In the development of these systems, there are relevant difficulties concerning the kinematic coupling between the robotic system and the person, which bring even to difficulties in wearability and of acceptability. In particular, the main obstacle to the development of an effective system resides in its mechanical architecture.

Concerning control, sensors and electronics, in fact, modern technologies provide a variety of devices always more miniaturized and effective, that, as well as the possibility to place many components in a position remote by the user, make less critical various design choices. We can not say the same about kinematics and mechanics, since the correct coupling of the joints and the correct wearability carry out a crucial effect on the acceptability and on the safety of the device. In particular, in the development of an active orthosis for upper limb, must be taken into account many factors:
   position of the actuators with respect to the user's body;
   transmission mechanism of the assistive action;
   number and position of passive degrees of freedom of the orthosis;
   number and position of elements of matching of the device to different anthropometries of the users (this factor is particularly relevant in case that the same device has to be used by different users);
   motion transmission in three-dimensional movements.

In particular, the actuating mechanisms dedicated to the mobility of a longitudinal segment of a upper limb (arm and forearm) or lower limb (thigh and leg) have a high problem concerning the actuation of a torsion of it. In fact, this operation must cause a relative rotation between a first and a second portion of the longitudinal segment about a longitudinal axis substantially coincident with the relative inner bone (humerus and ulna for upper limb, femur and tibia for lower limb).

Since this rotation cannot be caused by a motor aligned with the axis of the inner bone, for reasons of encumbrance or interference with other body segments, this operation has to be made by a remote centers actuating system, by using, for example, cylindrical joints comprising concentric cylinders arranged to rotate relatively by means of interposed bearings, creeping elements or slides with circular rails, of diameter identical or larger than the limb.

However, this type of systems has relevant drawbacks, since they are expensive systems, both in construction and in maintenance, not much reliable, since they comprise many components that can fail, and especially uncomfortable for the user, as they are heavy and bulky.

A possible solution is presented by WO2013186705 where it is described a mechanism that works essentially as a pantograph, wherein you can recognize two identical parallelogram linkages intertwined to each other (long side of one is adjacent to short side of the other one). However, this solution, however kinematically interesting, has a problem of efficiency in load transmission, since the length of the short side of the parallelogram linkages determines in an inversely proportional way the reaction forces in the structure equilibrating a given external load, and then the amount of the internal friction. Such length could be increased for minimizing such friction, but this would produce a high encumbrance with respect to the circumference about which the various elements rotate. It is therefore a system that cannot at the same time optimize both the efficiency and the encumbrance.

SUMMARY OF THE INVENTION

It is therefore a feature of the present invention to provide a kinematic chain that carries out a remote centers actuating system, allowing to actuate a relative rotation between two cylindrical concentric elements without placing a motor aligned to the rotation axis.

It is also a feature of the present invention to provide such a kinematic chain that does not require interposed bearings, creeping elements or slides with circular rails, of diameter identical or larger than the cylindrical elements above described.

It is also a feature of the present invention to provide such a kinematic chain that maintains a high efficiency in transmitting the torsional load between the two cylindrical elements (i.e. low reaction forces and associated friction in the structure), without the need to have longer leverages, i.e. without increasing the external encumbrance of the above described cylindrical elements.

It is also a feature of the present invention to provide an exoskeleton structure for rehabilitation of a user's limb that uses this kinematic chain for carrying out a torsion movement of a longitudinal segment of a user's limb.

It is still a feature of the present invention to provide an above described exoskeleton structure which is cheaper, more reliable and more comfortable with respect to the prior art devices.

It is a further feature of the present invention to provide an above described exoskeleton structure that allows to carry out the movement of flexion-extension and of abdo-adduction of an upper articulation of a user without generating parasitic forces on the user's joints.

It is still a feature of the present invention to provide an above described exoskeleton structure which can adapt to different anthropometries of a user.

These and other objects are achieved by a kinematic chain arranged to pivotally connect a first element to a second element, said first element comprising two pivot points $A_1$ e $B_1$ located at a distance $\overline{A_1B_1}$, said second element comprising two pivot points $A_2$ e $B_2$ located at a distance $\overline{A_2B_2}$, said kinematic chain comprising:
- a first external link pivotally connected to the first element at the pivot point $A_1$;
- a first end link pivotally connected to the first external link at a pivot point $D_1$, said pivot point $D_1$ being located at a distance $\overline{A_1D_1}$ by the pivot point $A_1$, said first external link and said first end link creating an angle $\widehat{D_2}=\theta$ and arranged to rotate with respect to each other about an axis $x_1$ passing through said pivot point $D_1$;
- a second external link pivotally connected to the second element at the pivot point $A_2$;
- a second end link that is pivotally connected to the second external link at a pivot point $D_2$, said pivot point $D_2$ being located at a distance $\overline{A_2D_2}$ by the pivot point $A_2$, said second external link and said second end link creating an angle $\widehat{D_2}=\widehat{D_2}=\theta$ and arranged to rotate with respect to each other about an axis $x_2$ parallel to said axis $x_1$ and passing through said pivot point $D_2$;
- a first intermediate link pivotally connected to the first element at the pivot point $B_1$ and integrally connected to the second end link at a junction point $C_2$;
- a second intermediate link pivotally connected to the second element at the pivot point $B_2$ and integrally connected to the first end link at a junction point $C_1$;

said first and second end link being pivotally connected to each other at a pivot point M, said pivot point M being located at a distance $\overline{MB_1}$ by the pivot point $B_1$, at a distance $\overline{MB_2}$ by the pivot point $B_2$, at a distance $\overline{MD_1}$ by the pivot point $D_1$ and at a distance $\overline{MD_2}$ by the pivot point $D_2$, wherein $\overline{MB_1}=\overline{A_1D_1}$, $\overline{MD_1}=\overline{A_1B_1}$ and $\overline{MB_2}=\overline{A_2D_2}$, $\overline{MD_2}=\overline{A_2B_2}$,
whose main feature is that, for any value of $\theta$, the projections of the pivot points $A_1$, $B_1$, $A_2$, $B_2$ in a plane $\Pi$, orthogonal to axes $x_1$ e $x_2$, lay in a circumference K, belonging to the plane $\Pi$, that has center O and radius $r=\overline{A_1D_1}=\overline{A_2D_2}=\overline{D_1B_2}=\overline{MB_2}=\overline{D_2B_1}=\overline{MB_1}$, in such a way that decreasing value of $\theta$ the first and the second element rotate with respect to each other about an axis z orthogonal to the plane $\Pi$ and passing through the center O in the direction for which the point $A_1$ is overlapped to the point $B_2$ and the point $B_1$ is overlapped to the point $A_2$.

In particular, the first and the second element have curved shape with radius of curvature r and centre of curvature O, in such a way that changing $\theta$ the first and the second element rotate with respect to each other about its axis z.

Advantageously, an actuating device is provided which is adapted to adjust the value of the angle $\theta$, in particular said actuating device comprising at least one motor.

The main advantage of the kinematic chain according to the present invention with respect to cylindrical joints of the prior art resides in that it is possible to actuate the relative rotation between the elements bringing in rotation any of the link with respect to a link hinged to it, changing proportionally all the angles set between links hinged to each other.

It is therefore possible, to obtain a cylindrical joint that brings in rotation to each other coplanar elements or elements arranged on parallel planes without needing the access to the axis with respect to which the rotation is carried out, but simply making a rotation of the kinematic chain about any axis orthogonal to the plane containing the circumference K and passing through one of the remote centers consisting of the above mentioned pivot points.

Furthermore, the present invention allows an external encumbrance of the circumference K that is very limited with respect to the prior art, since, for clear geometric reasons, any point of the kinematic chain can distance itself by the center of curvature O of a distance higher than 2r.

Furthermore, the present invention allows to bear a given torsional load with reaction forces internal to the structure, and relative mechanical frictions, that are inversely proportional to the distance $\overline{A_1B_1}$ (or the equivalent $\overline{A_2B_2}$). To increase the efficiency in the load transmission, this distance can be increased without increasing the external encumbrance of the circumference K. This allows then to reduce the encumbrance and the weight of the mechanism, or, under a same encumbrance, to increase the efficiency in the load transmission.

The kinematic chain claimed by the present invention can be applied in an effective way both to the field of robotic exoskeleton, both to other fields relating to the robotics, such as the fields of the manipulators and laparoscopic robot, and in general to any field where you need to rotate a cylindrical portion about its own longitudinal axis, but you cannot put a motor in the cylindrical portion itself, for weight reasons or because the cylindrical portion is already encumbered with cables or other instrumentations.

According to another aspect of the invention, an exoskeleton structure for rehabilitation of an articulation of a user's limb comprises:
- a first and a second engagement element arranged to engage with a user's limb at a longitudinal segment having a longitudinal axis;
- a cylindrical joint arranged to cause a relative rotation between the first and the second engagement element substantially about the longitudinal axis;

whose main feature is that the cylindrical joint comprises the kinematic chain according to the present invention, said first element comprising the first engagement element and said second element comprising the second engagement element.

In particular, the engagement elements are located on parallel planes in such a way that the projections of the points $A_1$, $B_1$, $A_2$, $B_2$ in the plane $\Pi$ lay on the same circumference K having centre O and radius r. In this case, therefore, the cylindrical joint allows the rotation between the two engagement elements about an axis passing through the centers of curvature of the two engagement elements itself.

Advantageously, the first and the second engagement element are adapted to engage with user's arm at different height and the cylindrical joint is configured to cause a relative rotation between the first and the second engagement element substantially about the axis of the user's humerus.

In particular, an exoskeleton device for shoulder is also provided comprising:
- a first flange pivotally engaged with the user's torso at an axis of abd-adduction x orthogonal to the first flange same;
- a second flange integral and substantially orthogonal to the first flange, said second flange being pivotally engaged with the second engagement element at a flexion/extension axis y orthogonal to the abdo-adduction axis x.

In particular, the first flange is pivotally connected to the user's torso by a connection link having a first end, connected to the first flange at the abd-adduction axis x by a rotational joint, and a second end, connected by a spherical joint to an engagement belt arranged to engage with the user's torso.

In particular, the exoskeleton device for shoulder comprises furthermore:
- a first motor having rotation axis parallel to the abdo-adduction axis x, said first motor arranged to cause the rotation of the first flange about its abdo-adduction axis x;
- a second motor having rotation axis parallel to the abdo-adduction axis x, said second motor arranged to cause a relative rotation between the second flange and the second engagement element.

In particular, the rotation caused by the second motor is transmitted by means of cables, chains, belts or other flexible elements, meshing on pulleys or sprockets, which transmit the rotation between two orthogonal axes.

Advantageously, an exoskeleton device for elbow is also provided comprising:
- a support element constrained to the first engagement element through adjustment means;
- a third engagement element arranged to engage with a user's limb at the forearm, said third engagement element being pivotally constrained to the support element.

In particular, the adjustment means comprises:
- a slide arranged to axially adjust the relative position between the support element and the engagement element;
- a pivotal constraint arranged to rotationally adjust the relative position between the support element and the engagement element.

This way, it is possible to adapt the exoskeleton structure to different anthropometric sizes of a user.

Advantageously, the support element comprises a motor arranged to cause a rotating the third engagement element with respect to the support element, in particular said rotation being transmitted by a couple of mating gears with orthogonal axes, as conical wheels, screw/nut screw or helical gears with not incidental orthogonal axes.

In particular, a support base is also provided comprising:
- a platform of fastening to ground comprising a support column;
- a parallelogram linkage comprising two parallel rods pivotally connected to the support column and to an end element, said end element being pivotally connected to the first flange at the abdo-adduction axis x.

In particular, the parallelogram linkage can also rotate about vertical axes both with respect to the support column, both with respect to the first flange.

Advantageously, the parallel rods are connected to a counterweight that counterbalances the weight of the exoskeleton structure pivoting on the pivot points between the parallel rods and the support column.

In particular, the platform of fastening has wheels that allow the handling and the and repositioning of the support base, in order to ensure a maximum freedom of movement to the user.

BRIEF DESCRIPTION OF THE DRAWINGS

Further characteristic and/or advantages of the present invention are more bright with the following description of an exemplary embodiment thereof, exemplifying but not limitative, with reference to the attached drawings in which:

FIG. 6 shows, in plan view, a possible exemplary embodiment of an exoskeleton structure for rehabilitation of an articulation of a user's limb, which integrates the kinematic chain according to the present invention;

DESCRIPTION OF A PREFERRED EXEMPLARY EMBODIMENT

Figure 1:
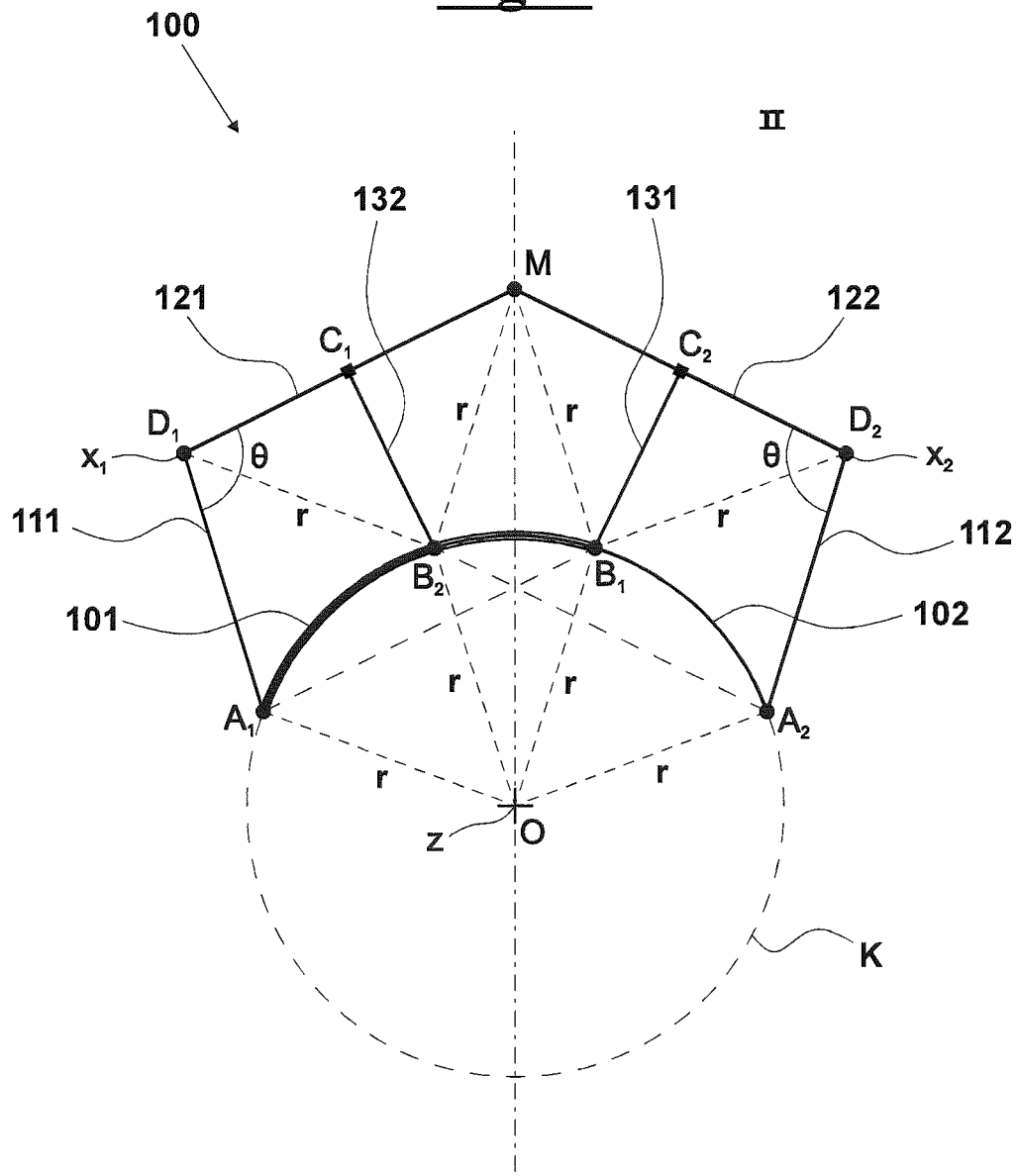
FIG. 1 shows the geometric scheme of a kinematic chain, according to the present invention, for the relative rotation between two coaxial cylindrical elements, by means of remote centers actuation.
Figure 2:
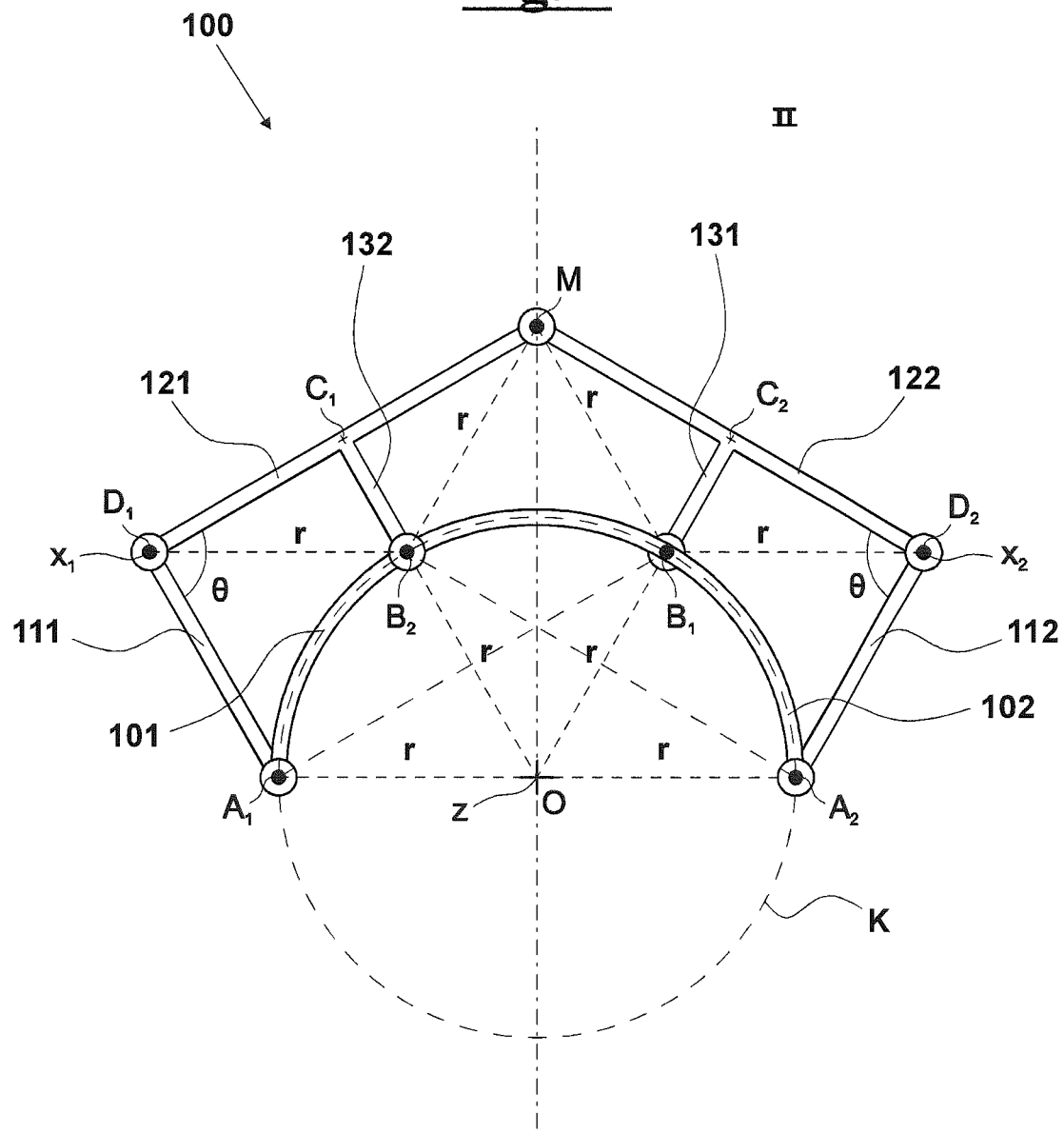
FIG. 2 shows, in plan view, a schematic representation of a cylindrical joint that uses the kinematic chain of FIG. 1.
Figure 3:
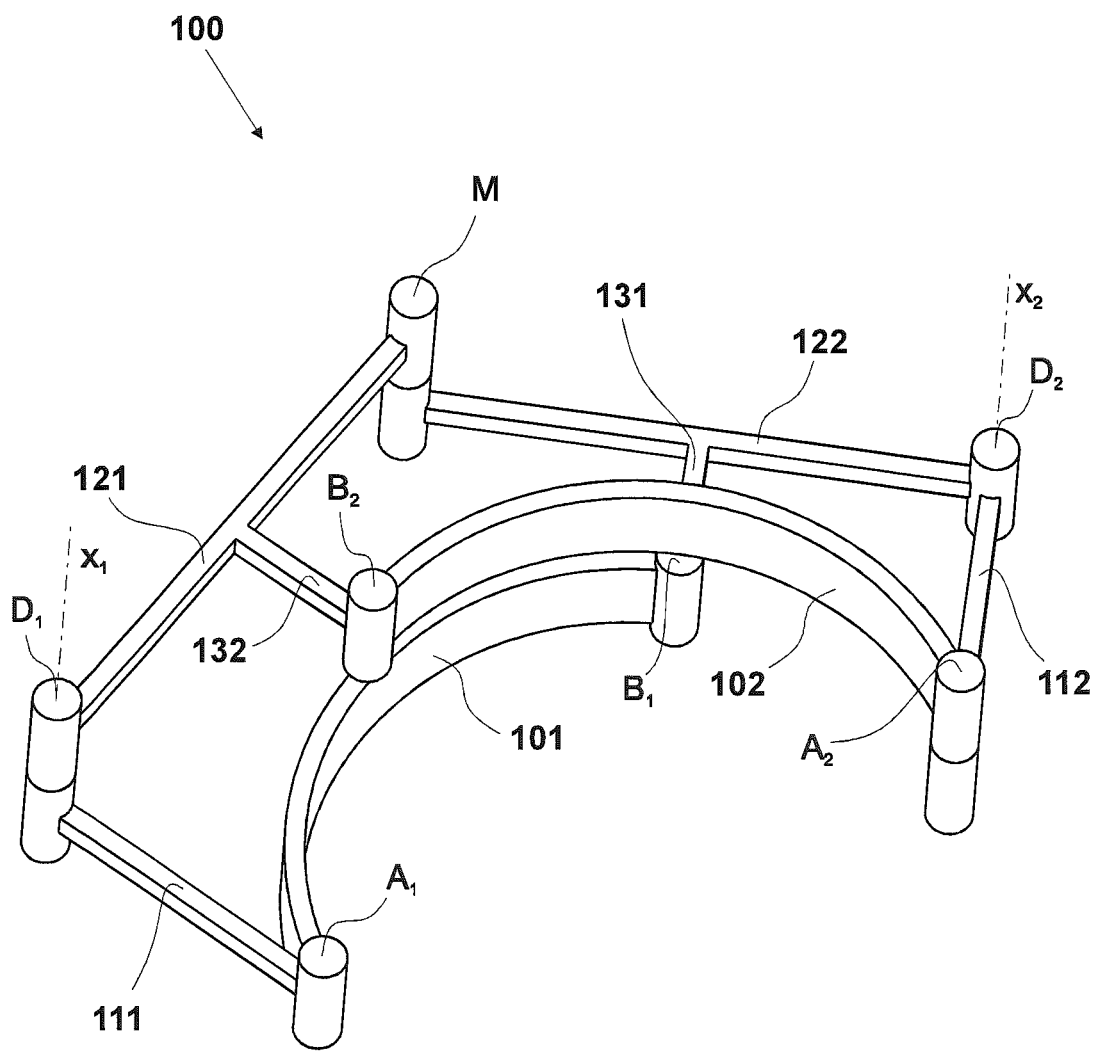
FIG. 3 shows, in perspective, the schematic representation of the joint of FIG. 1.

In FIG. 1 a geometric scheme is shown of the kinematic chain 100, according to the present invention, for the relative rotation between two elements 101,102 by means of a remote centers system.

In particular, the first element 101 comprises two pivot points $A_1$ and $B_1$ located at a distance $\overline{A_1 B_1}$, whereas the second element 102 comprises two pivot points $A_2$ and $B_2$ located at a distance $\overline{A_2 B_2}$. Two external links 111,112 are then provided hinged to the elements 101,102, respectively, at the pivot points $A_1$ and $A_2$. Two end links 121,122 are then hinged to the external links 111,112, respectively, at pivot points $D_1$ and $D_1$, and they are also hinged to each other at a pivot point M. Finally, two intermediate links 131,132 are hinged to the elements 101,102, respectively, at the pivot points $B_1$ and $B_2$, and they are also integrally connected to the end links 121,122, respectively, at points of fixed joint $C_1$ and $C_2$.

By appropriately sizing the distance between the various above mentioned points in such a way that you have $\overline{MB_1} = \overline{A_1 D_1}$, $\overline{MD_1} = \overline{A_1 B_1}$, $\overline{MB_2} = \overline{A_2 D_2}$, $\overline{MD_2} = \overline{A_2 B_2}$, the kinematic chain 100 is the combination of two virtual parallelogram linkages, wherein, in particular, points $A_1$, $B_1$, M, $D_1$ shape the vertices of a first parallelogram linkage, whereas points $A_2$, $B_2$, M, $D_2$ shape the vertices of a second parallelogram linkage.

Defining $\widehat{D_2} = \theta$ the angle shaped by the links 111,121, using easy geometric formulas it is possible to show that it is equal to angle shaped by the links 112,122 $\widehat{D_2} = \theta$ and that a variation any of value of θ keeps constantly points $A_1$, $B_1$, $A_2$, $B_2$ on a circumference K, belonging to the plane Π, and having center O and radius $r = \overline{A_1 D_1} = \overline{A_2 D_2} = \overline{D_1 B_2} = \overline{MB_2} = \overline{D_2 B_1} = \overline{MB_1}$.

In particular, being the points $A_1$ and $B_1$ integral to the element 101 and the points $A_2$ and $B_2$ integral to the element 102, it is possible to show that decreasing the value of θ the elements 101,102 rotate with respect to each other about the center O in the direction for which the point $A_1$ is overlapped to the point $B_2$ and the point $B_1$ is overlapped to the point $A_2$ on the circumference K.

In particular, the first and the second element 101,102 have curved shape with radius of curvature r and center of curvature O, in such a way that changing θ the first and the second element 101,102 rotate with respect to each other about an axis perpendicular to the sheet and passing through the center of curvature O.

In the FIGS. 2, 3, 4, 5A and 5B, respectively, a schematic application and a realistic application of the kinematic chain 100 are shown. In particular, in such exemplary embodiments the elements 101 and 102 are located on parallel planes in such a way that the projections orthogonal to the sheet of the points $A_1$, $B_1$, $A_2$, $B_2$ lay on the same circumference K having center O and radius r. In this case, therefore, the kinematic chain 100 carries out a cylindrical joint that allows the rotation between the two elements 101 and 102 about an axis passing through the centers of curvature of the two elements 101 and 102.

Figure 4:
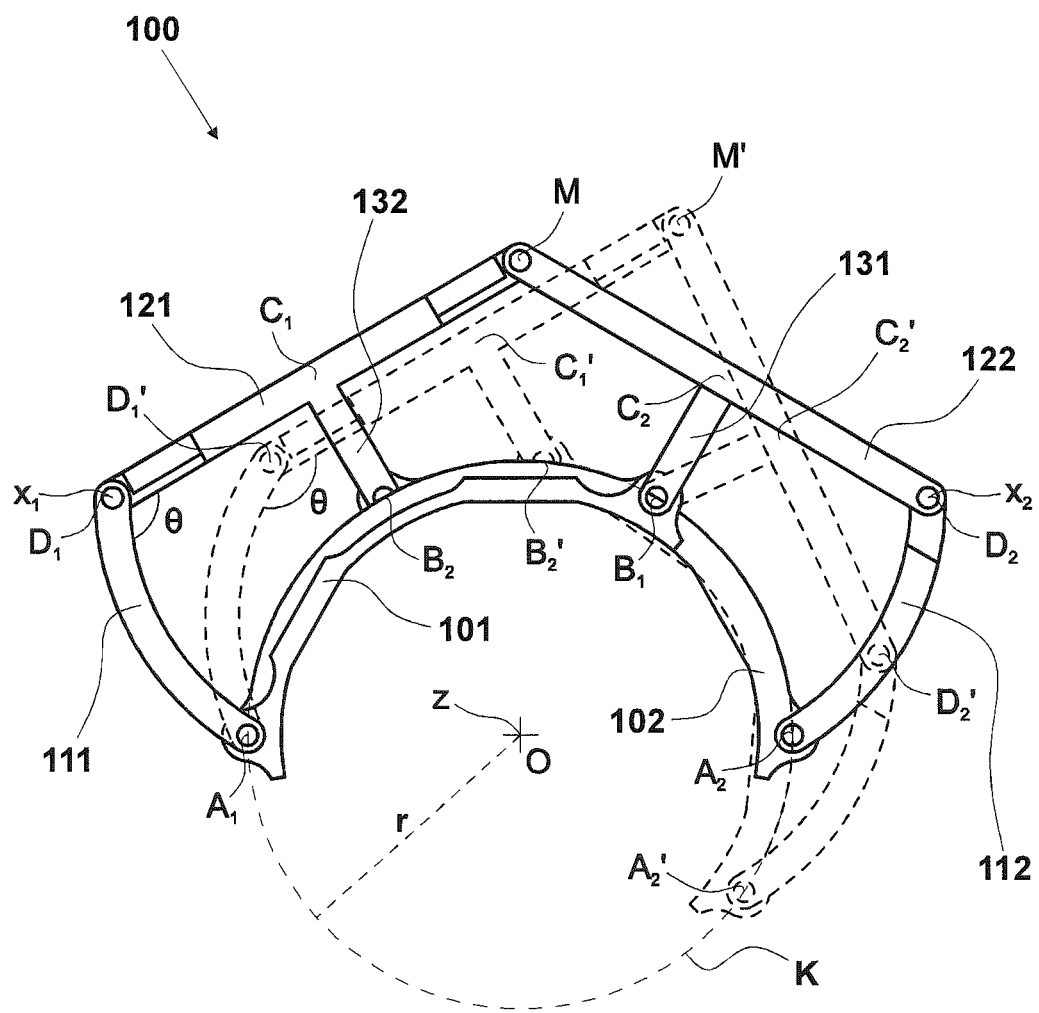
FIG. 4 shows, in plan view, a possible exemplary embodiment of a cylindrical joint that uses the kinematic chain of FIG. 1.
Figure 5A:
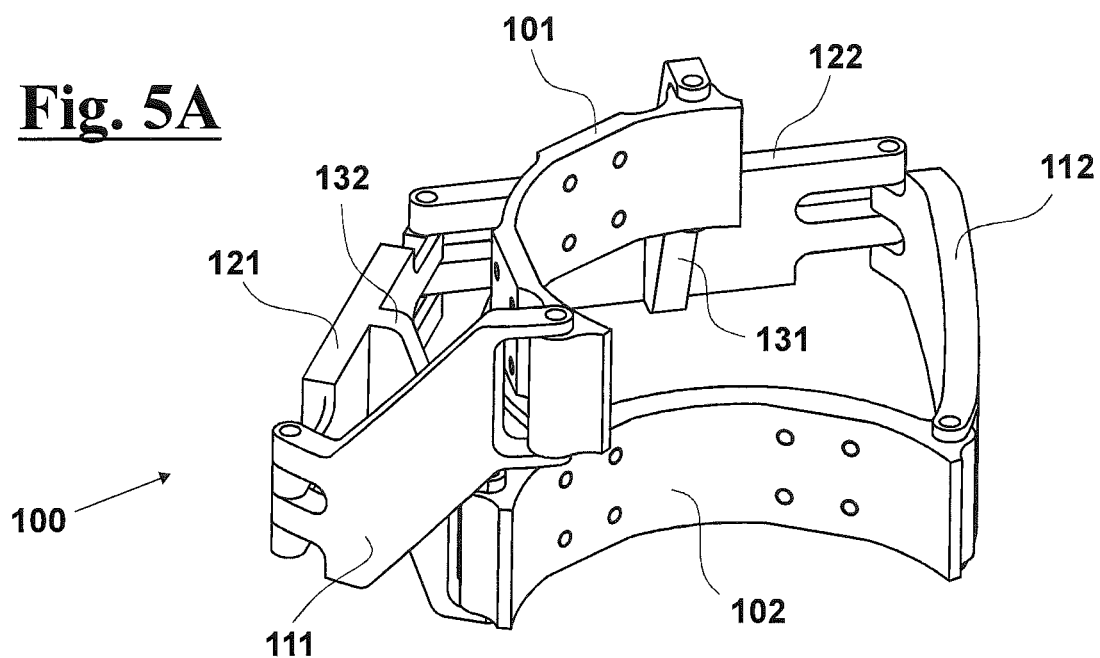
FIGS. 5A and 5B show, from different perspectives, the cylindrical joint of FIG. 4.
Figure 5B:
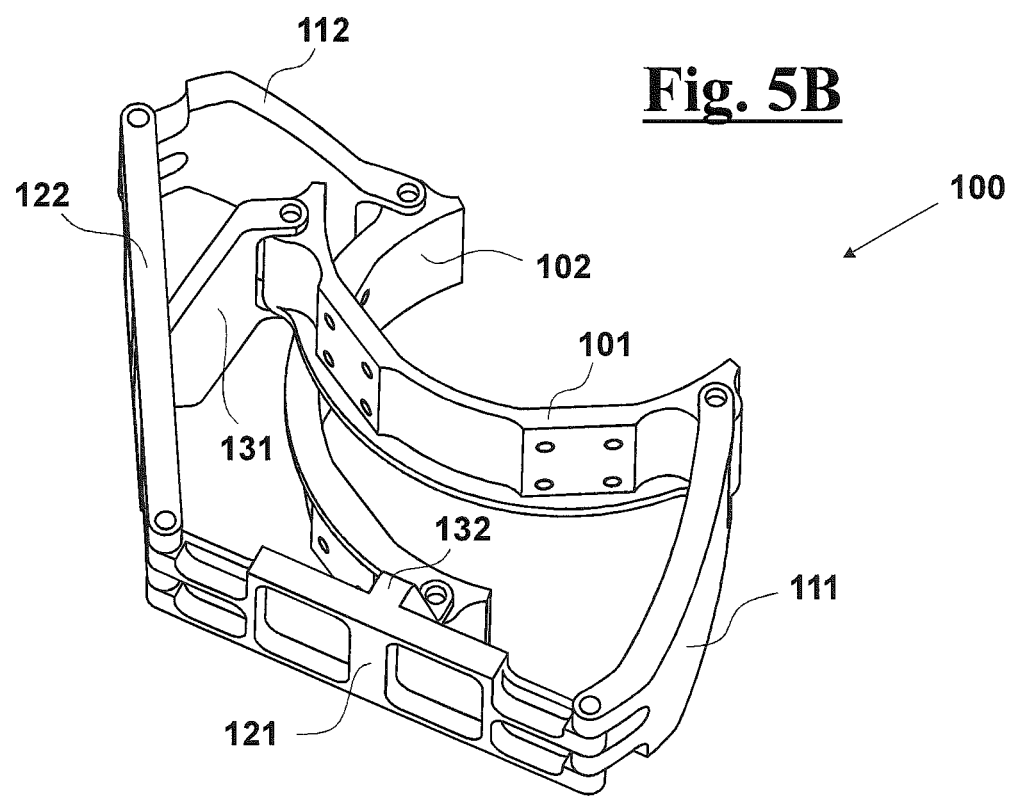

In particular, in FIG. 4 a rotation of the element 102 is shown with respect to the element 101 that remains fixed. The dashed lines show the position of the kinematic chain 100 in consequence of a change of the angle θ. It is possible to see the sliding the points $A_2$, $B_2$, $C_1$, $D_1$, $C_2$, $D_2$, M in the corresponding points $A'_2$, $B'_2$, $C'_1$, $D'_1$, $C'_2$, $D'_2$, M'.

The main advantage of the kinematic chain 100 with respect to cylindrical joints of the prior art resides in that it is possible to actuate the relative rotation between the elements 101 and 102 bringing in rotation any of the links 111,121,131,112,122,132 with respect to a link hinged to it, changing proportionally all the angles set between links hinged to each other.

It is therefore possible, to obtain a cylindrical joint that brings in rotation to each other coplanar elements or elements arranged on parallel planes without needing the access to the axis with respect to which the rotation is carried out, but simply making a rotation of the kinematic chain about any axis orthogonal to the plane containing the circumference K and passing through one of the remote centers consisting of the above mentioned pivot points.

Figure 7A:
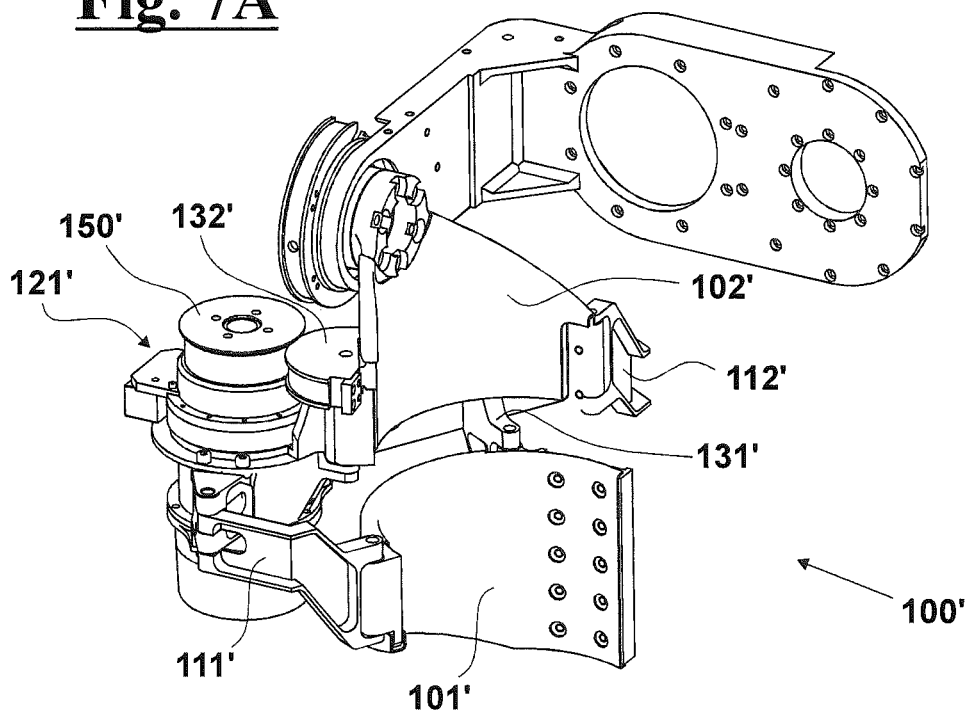
FIGS. 7A and 7B show, from different perspectives, the exoskeleton structure of FIG. 6.
Figure 7B:
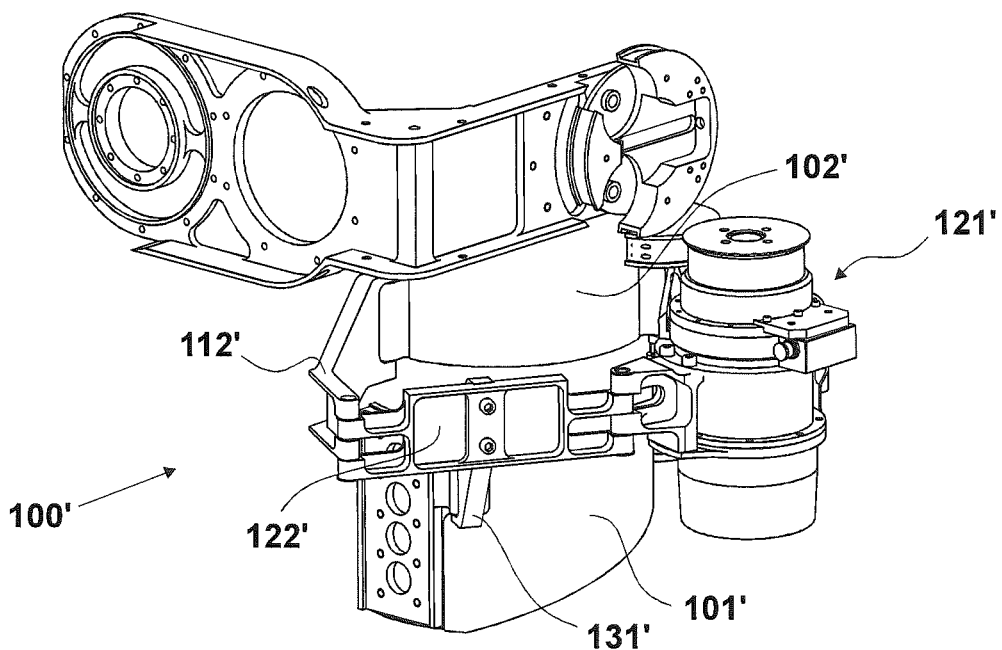

In the FIGS. 6, 7A and 7B an exoskeleton structure for rehabilitation of an articulation of a user's limb is shown that uses a cylindrical joint 100' comprising the kinematic chain 100 above described.

In particular, the two engagement elements 101' and 102' are adapted to engage with a user's limb at a longitudinal segment, such as an arm, a forearm, a thigh or a leg. Advantageously, the engagement elements 101' and 102' are adapted to engage at two portions located at different heights along the longitudinal axis of the anatomical segment.

Furthermore, the exoskeleton structure comprises a motor 150' configured to actuate the cylindrical joint 100', in order to produce a relative rotation between the engagement elements 101' and 102', thus obtaining a torsion of the anatomical segment about its own axis.

More in detail, in an exemplary embodiment of FIGS. 6, 7A and 7B the engagement elements 101' and 102' can be engaged to user's arm at different heights, in such a way that the motor 150' can actuate a torsion of the arm about an axis substantially passing through the user's humerus.

The use of the kinematic chain 100 in the exoskeleton structure above described makes it possible to carry out the torsion of the arm by a motor located in remote, without needing creeping elements or engagement elements that completely envelop the user's arm resulting uncomfortable and heavy, besides being difficult to wear and to maintain.

Figure 8:
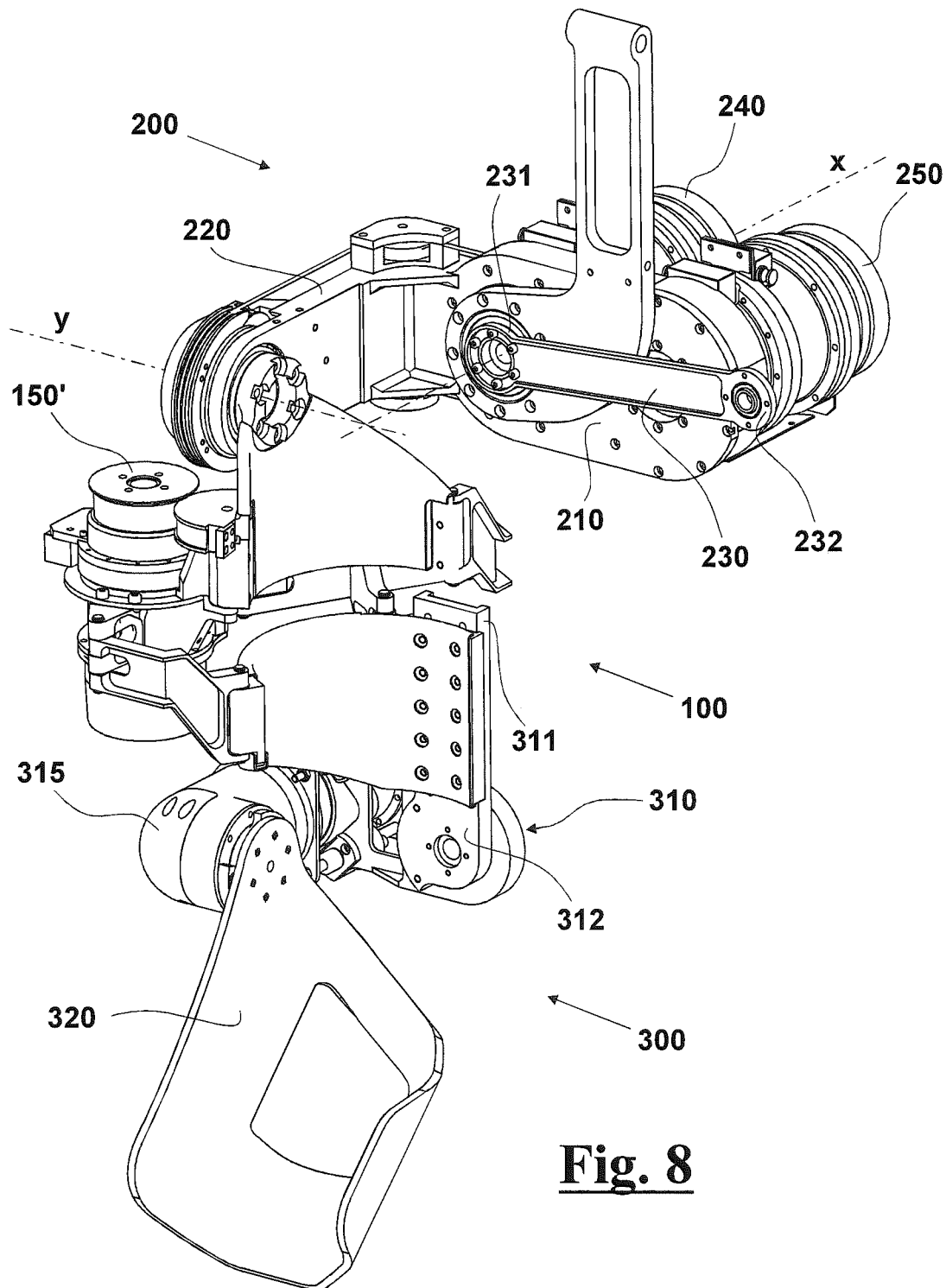
FIG. 8 shows a perspective view of an exemplary embodiment alternative to the exoskeleton structure of FIG. 6, wherein exoskeleton devices for shoulder and for elbow are also comprised.

In FIG. 8 the exoskeleton structure of previous figures is shown, wherein an exoskeleton device for shoulder 200 and an exoskeleton device for elbow 300 are also provided.

In particular, the exoskeleton device for shoulder 200 comprises a first flange 210 pivotally engaged with the shoulder of a user at a abdo-adduction axis x. In particular, a connection link 230 is provided having a first end 231, connected to the first flange 210 at the abdo-adduction axis x by a rotational joint, and a second end 232, connected by a spherical joint to an engagement belt arranged to engage with the user's torso. The exoskeleton device for shoulder 200 comprises then a second flange 220, integral and substantially orthogonal to the first flange 210, and pivotally engaged with the second engagement element 102' at an axis of flexion-extension y orthogonal to the abdo-adduction axis x.

The exoskeleton device for shoulder 200 also comprises a first motor 240 having rotation axis coincident with the abdo-adduction axis x, in order to cause the rotation of the first flange 210 about its abdo-adduction axis x. A second motor 250 is further provided that has rotation axis parallel to the abdo-adduction axis x, and arranged to cause a relative rotation between the second flange 220 and the second engagement element 102'. In particular, the rotation is transmitted by means of cables, chains, belts or other flexible elements, meshing on pulleys or sprockets, which transmit the rotation between two orthogonal axes, as shown in FIG. 6. The advantage of placing the two motors 240,250 both on the first flange 210 resides in reducing the moment of inertia during the rotation about its abdo-adduction axis x.

Still with reference to FIG. 8, the exoskeleton device for elbow 300 comprises a support element 310 constrained to the first engagement element 101' through adjustment means. The exoskeleton device for elbow 300 also comprises a third engagement element 320, pivotally constrained to the support element 310, and arranged to engage with a user's limb at the forearm.

In particular, the adjustment means comprises a slide 311 and a pivotal constraint 312 arranged to allow to adjust, respectively, axially and rotationally the relative position between the support element 310 and the engagement element 101'. This way, it is possible to adapt the exoskeleton structure to different anthropometric sizes of a user.

Advantageously, the support element 310 comprises a motor 315 arranged to cause a rotation of said third engagement element 320 with respect to said support element 310, in particular said rotation being transmitted by a couple of mating gears with orthogonal axes, as conical wheels, screw/nut screw or helical gears with not incidental orthogonal axes.

Figure 9:
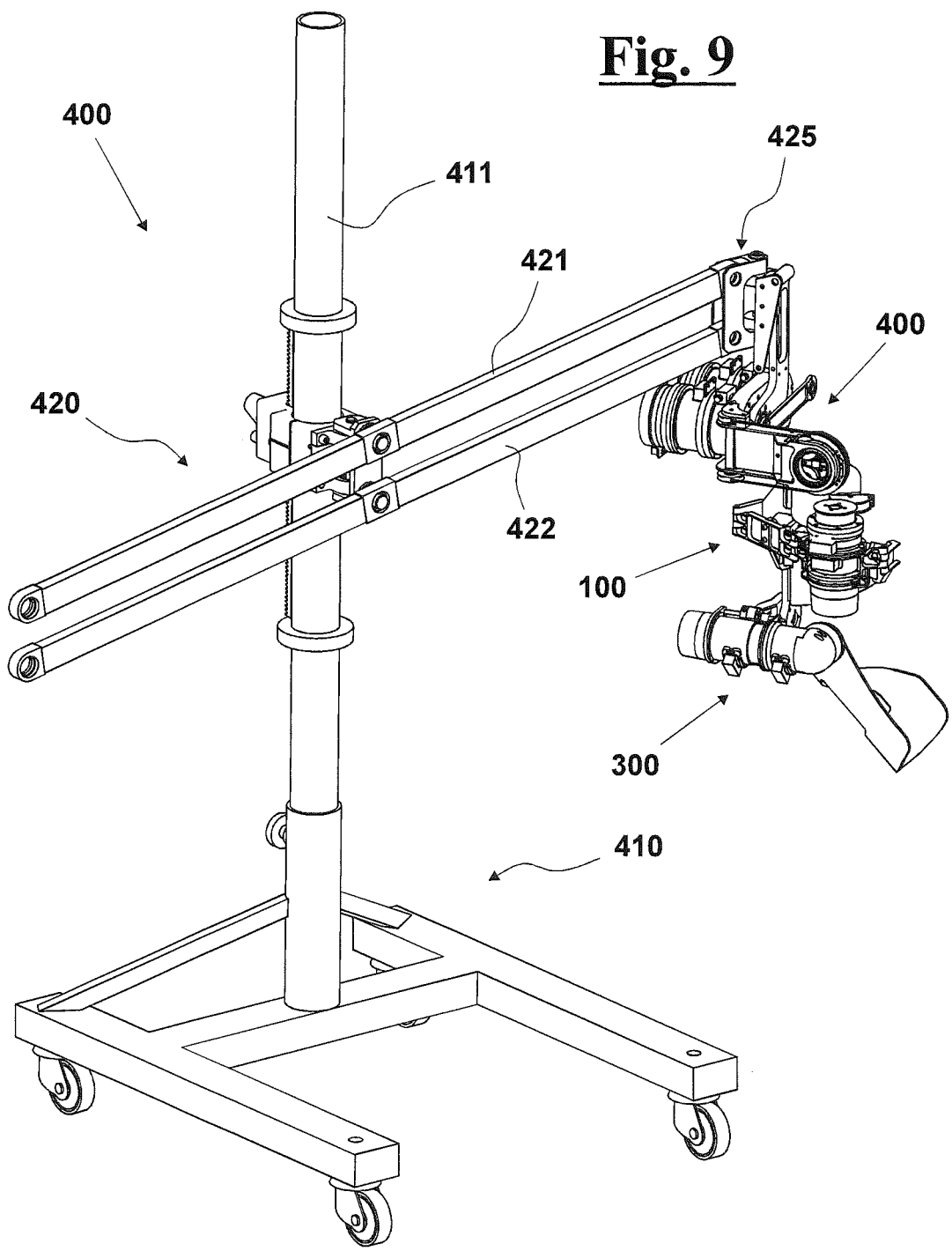
FIG. 9 shows a perspective view of an alternative exemplary embodiment of the exoskeleton structure of FIG. 6, where a movable support base is also comprised.

In FIG. 9 the exoskeleton structure of previous figures is shown, where a support base 400 is also provided comprising a platform of fastening to ground 410 equipped with a support column 411. The support base also comprises a parallelogram linkage 420 consisting of two parallel rods 421,422 hinged to the support column 411 and to an end element 425 pivotally connected to the first flange 210 at the abdo-adduction axis x.

In particular, the parallelogram linkage 420 can also rotate about vertical axes both with respect to the support column, both with respect to the first flange.

Advantageously, the parallel rods are connected to a counterweight that counterbalances the weight of the exoskeleton structure pivoting on the pivot points between the parallel rods and the support column.

In particular, the platform of fastening has wheels that allow the handling and the and repositioning of the support base 400, in order to ensure a maximum freedom of movement to the user.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:

1. An exoskeleton kinematic chain (100) arranged to pivotally connect a first element (101) to a second element (102), said first element (101) comprising two pivot points $A_1$ and $B_1$ located at a distance $\overline{A_1B_1}$, said second element (102) comprising two pivot points $A_2$ and $B_2$ located at a distance $\overline{A_2B_2}$, said exoskeleton kinematic chain (100) comprising:
    a first external link (111) pivotally connected to said first element (101) at said pivot point $A_1$;
    a first end link (121) pivotally connected to said first external link (111) at a pivot point $D_1$, said pivot point $D_1$ being located at a distance $\overline{A_1D_1}$ from said pivot point $A_1$, said first external link (111) and said first end link (121) creating an angle $\widehat{D_2} = \theta$ and arranged to rotate with respect to each other about an axis $x_1$ passing through said pivot point $D_1$;
    a second external link (112) pivotally connected to said second element (102) at said pivot point $A_2$;
    a second end link (122) pivotally connected to said second external link (112) at a pivot point $D_2$, said pivot point $D_2$ being located at a distance $\overline{A_2D_2}$ from said pivot point $A_2$, said second external link (112) and said second end link (122) creating an angle $\widehat{D_2} = \widehat{D_2} = \theta$ and arranged to rotate with respect to each other about an axis $x_2$ parallel to said axis $x_1$ and passing through said pivot point $D_2$;
    a first intermediate link (131) pivotally connected to said first element (101) at said pivot point $B_1$ and integrally connected to said second end link (122) at a junction point $C_2$;
    a second intermediate link (132) pivotally connected to said second element (102) at said pivot point $B_2$ and integrally connected to said first end link (121) at a junction point $C_1$;
    said first and second end links (121, 122) being pivotally connected to each other at a pivot point M, said pivot point M being located at a distance $\overline{MB_1}$ from said pivot point $B_1$, at a distance $\overline{MB_2}$ from said pivot point $B_2$, at a distance $\overline{MD_1}$ from said pivot point $D_1$ and at a distance $\overline{MD_2}$ from said pivot point $D_2$, wherein $\overline{MB_1} = \overline{A_1D_1}$, $\overline{MD_1} = \overline{A_1B_1}$ and $\overline{MB_2} = \overline{A_2D_2}$, $\overline{MD_2} = \overline{A_2B_2}$,
    wherein for any value of $\theta$, the projections of said pivot points $A_1$, $B_1$, $A_2$, $B_2$ in a plane $\Pi$, orthogonal to said axes $x_1$ and $x_2$, lay in a circumference K, belonging to said plane $\Pi$, that has a center O and a radius $r = \overline{A_1D_1} = \overline{A_2D_2} = \overline{D_1B_2} = \overline{MB_2} = \overline{D_2B_1} = \overline{MB_1}$, and in that said first element (101) and said second element (102) are each arc-shaped with the same radius r and the same center O, in such a way that decreasing the value of $\theta$ said first and second elements (101, 102) rotate concentrically to the circumference K and overlap with respect to each other about an axis z orthogonal to said plane $\pi$ and passing through said center O in the direction for which said point $A_1$ is overlapped to said point $B_2$ and said point $B_1$ is overlapped to said point $A_2$.

2. The exoskeleton kinematic chain (100), according to claim 1, further comprising an actuating device which is adapted to adjust the value of said angle $\theta$, said actuating device comprising at least one motor.

3. An exoskeleton structure for rehabilitation of an articulation of a user's limb, said structure comprising:
    a first and a second engagement element (102') arranged to engage with a user's limb at a longitudinal segment having a longitudinal axis;
    a cylindrical joint (100') arranged to cause a relative rotation between said first and second engagement element (101', 102') substantially about said longitudinal axis;
    wherein said cylindrical joint (100') comprises the exoskeleton kinematic chain (100) according to claim 1, said first element (101) comprising said first engagement element (101') and said second element (102) comprising said second engagement element (102').

4. The exoskeleton structure, according to claim 3, wherein said first and second engagement element (101', 102') are adapted to engage with user's arm and wherein said cylindrical joint (100') is configured to cause a relative rotation between said first and second engagement element (101', 102' which is adapted to be) substantially about the axis of said user's humerus, and where an exoskeleton device configured for said user's shoulder (200) is also provided comprising:
    a first flange (210) pivotally engaged with the user's torso at an abdo-adduction axis x orthogonal to said first flange (210);
    a second flange (220) integral and substantially orthogonal to said first flange (210), said second flange (220) being pivotally engaged with said second engagement element (102') at a flexion/extension axis y orthogonal to said abdo-adduction axis x.

5. The exoskeleton structure, according to claim 4, wherein said first flange (210) is configured to be pivotally connected to the user's torso by a connection link (230) having a first end (231), connected to said first flange (210) at said abdo-adduction axis x by a rotational joint, and a second end (232), connected by a spherical joint to an engagement belt arranged to engage with the user's torso.

6. The exoskeleton structure, according to claim 4, wherein
    said exoskeleton device for a user's shoulder comprises furthermore:
    a first motor (240) having rotation axis parallel to said abdo-adduction axis x, said first motor (240) arranged to cause the rotation of said first flange (210) about said abdo-adduction axis x;
    a second motor (250) having rotation axis parallel to said abdo-adduction axis x, said second motor (250) arranged to cause a relative rotation between said second flange (220) and said second engagement element (102'), said rotation being transmitted by means of cables and pulleys.

7. The exoskeleton structure, according to claim 3, wherein said first and second engagement element (101', 102') are adapted to engage with user's arm and wherein said cylindrical joint (100') is configured to cause a relative rotation between said first and second engagement element (101', 102') substantially about the axis of said user's homerus, and where an exoskeleton device for elbow (300) is also provided comprising:

a support element (310) constrained to said first engagement element (101') through adjustment means;

a third engagement element (320) arranged to engage with a user's limb at the forearm, said third engagement element (320) being pivotally constrained to said support element (310).

8. The exoskeleton structure, according to claim 7, wherein said adjustment means comprises:

a slide (311) arranged to axially adjust the relative position between said support element (310) and said engagement element (101');

a pivotal constraint (312) arranged to rotationally adjust the relative position between said support element (310) and said engagement element (101').

9. The exoskeleton structure, according to claim 7, wherein said support element (310) comprises a motor (315) arranged to cause a rotation of said third engagement element (320) with respect to said support element (310), said rotation being transmitted by a couple of mating gears with orthogonal axes.

10. The exoskeleton structure, according to claim 4, further comprising a support base (400) is also provided comprising:

a platform capable of fastening to the ground (410) comprising a support column (411);

a parallelogram linkage (420) comprising two parallel rods (421, 422) pivotally connected to said support column (411) and to an end element (425), said end element (425) being pivotally connected to said first flange (210) at said abdo-adduction axis x.

11. The exoskeleton structure, according to claim 1, wherein the first and second external links (111, 112) are arc-shaped, and the first and second end links (121, 122), and the first and second intermediate links (131, 132) are linearly shaped.

* * * * *

UNITED STATES PATENT AND TRADEMARK OFFICE
CERTIFICATE OF CORRECTION

PATENT NO. : 10,736,809 B2  
APPLICATION NO. : 15/565610  
DATED : August 11, 2020  
INVENTOR(S) : Marco Cempini et al.

Page 1 of 1

It is certified that error appears in the above-identified patent and that said Letters Patent is hereby corrected as shown below:

On the Title Page  
Item (73), Second Assignee, change "AZIENDA OSPEDALIERA PISANA" to --AZIENDA OSPEDALIERO-UNIVERSITARIA PISANA--

Signed and Sealed this  
Eighth Day of December, 2020

Andrei Iancu  
*Director of the United States Patent and Trademark Office*